United States Patent
Xu et al.

(10) Patent No.: US 11,564,259 B2
(45) Date of Patent: Jan. 24, 2023

(54) RANDOM ACCESS PROCESSING METHOD AND RELATED DEVICE

(71) Applicant: Huawei Technologies Co., Ltd., Shenzhen (CN)

(72) Inventors: Xiaoying Xu, Shanghai (CN); Chunhua You, Shanghai (CN); Qufang Huang, Shanghai (CN); Xing Liu, Shenzhen (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 17/039,809

(22) Filed: Sep. 30, 2020

(65) Prior Publication Data
US 2021/0022187 A1 Jan. 21, 2021

Related U.S. Application Data

(63) Continuation of application No. PCT/CN2019/081538, filed on Apr. 4, 2019.

(30) Foreign Application Priority Data

Apr. 4, 2018 (CN) .......................... 201810302231.6

(51) Int. Cl.
*H04W 74/08* (2009.01)
*H04W 72/04* (2009.01)
(Continued)

(52) U.S. Cl.
CPC ....... *H04W 74/0833* (2013.01); *H04L 1/1671* (2013.01); *H04W 72/042* (2013.01);
(Continued)

(58) Field of Classification Search
None
See application file for complete search history.

(56) References Cited

U.S. PATENT DOCUMENTS 11,432,188 B2 * 8/2022 Akkarakaran ........ H04W 28/06
11,438,960 B2 * 9/2022 Babaei ................ H04L 43/0864
(Continued)

FOREIGN PATENT DOCUMENTS

| CN | 104380765 A | 2/2015 |
| CN | 106031074 A | 10/2016 |

(Continued)

OTHER PUBLICATIONS

LG Electronics, Data transmission during random access procedure in NB-IoT. 3GPP TSG RAN WG1 Meeting #90, Prague, Czech Republic 21st Aug. 25, 2017, R1-1713103, 6 pages.
(Continued)

*Primary Examiner* — Faiyazkhan Ghafoerkhan
(74) *Attorney, Agent, or Firm* — Slater Matsil, LLP (57) ABSTRACT

Embodiments of this application provide a random access processing method. A random access preamble and uplink data are sent in an initiation phase of a random access procedure, and the random access procedure is ended in time after feedback information for the uplink data is received. According to technical solutions provided in the embodiments of this application, a terminal side device may send the uplink data when sending the random access preamble in the random access procedure. In addition, the random access procedure can be ended in advance after the feedback information for the uplink data is received.

18 Claims, 3 Drawing Sheets

(51) Int. Cl.
    *H04W 74/00*   (2009.01)
    *H04W 80/02*   (2009.01)
    *H04L 1/16*    (2006.01)

(52) U.S. Cl.
    CPC ....... *H04W 72/044* (2013.01); *H04W 74/004* (2013.01); *H04W 74/006* (2013.01); *H04W 80/02* (2013.01)

(56) References Cited

U.S. PATENT DOCUMENTS

| | | | | |
|---|---|---|---|---|
| 2005/0243767 | A1* | 11/2005 | Zhang | H04L 1/1812 370/329 |
| 2010/0070814 | A1* | 3/2010 | Damnjanovic ... | H04W 72/1284 714/809 |
| 2012/0008524 | A1* | 1/2012 | Amirijoo | H04W 24/10 370/252 |
| 2013/0315194 | A1* | 11/2013 | Ahn | H04L 5/0044 370/329 |
| 2014/0126520 | A1* | 5/2014 | Quan | H04W 72/042 370/329 |
| 2014/0321406 | A1* | 10/2014 | Marinier | H04B 7/024 370/329 |
| 2015/0117233 | A1* | 4/2015 | Wong | H04W 72/02 370/336 |
| 2016/0219634 | A1* | 7/2016 | Lu | H04W 76/14 |
| 2016/0295609 | A1* | 10/2016 | Vajapeyam | H04L 5/14 |
| 2017/0164411 | A1* | 6/2017 | Choi | H04W 74/0833 |
| 2017/0367138 | A1* | 12/2017 | Lu | H04W 72/0413 |
| 2018/0152906 | A1* | 5/2018 | Kim | H04W 56/0005 |
| 2018/0213572 | A1* | 7/2018 | Zhang | H04W 72/1284 |
| 2018/0279193 | A1* | 9/2018 | Park | H04W 36/30 |
| 2018/0302196 | A1* | 10/2018 | Sadeghi | H04L 5/1469 |
| 2018/0324850 | A1* | 11/2018 | Amuru | H04W 74/006 |
| 2019/0215864 | A1* | 7/2019 | Yang | H04W 80/02 |
| 2019/0254064 | A1* | 8/2019 | Islam | H04W 16/00 |
| 2019/0268961 | A1* | 8/2019 | Tsai | H04W 16/28 |
| 2019/0342845 | A1* | 11/2019 | Laselva | H04L 1/1812 |
| 2019/0357078 | A1* | 11/2019 | Akkarakaran | H04L 1/1896 |
| 2019/0380056 | A1* | 12/2019 | Lee | H04B 7/0695 |
| 2020/0008233 | A1* | 1/2020 | Xiong | H04W 74/0833 |
| 2020/0100297 | A1* | 3/2020 | Agiwal | H04W 52/50 |
| 2020/0107377 | A1* | 4/2020 | Lee | H04L 1/1812 |
| 2020/0314889 | A1* | 10/2020 | Cirik | H04W 72/14 |
| 2020/0367095 | A1* | 11/2020 | Pan | H04L 1/1874 |
| 2021/0022187 | A1* | 1/2021 | Xu | H04W 74/006 |
| 2021/0194756 | A1* | 6/2021 | Babaei | H04L 41/0654 |
| 2021/0227587 | A1* | 7/2021 | Tsai | H04W 72/0413 |

FOREIGN PATENT DOCUMENTS

| | | |
|---|---|---|
| CN | 107872899 A | 4/2018 |
| WO | 2018027656 A1 | 2/2018 |

OTHER PUBLICATIONS

3GPP TS 38.321 V15.1.0 (Mar. 2018), 3rd Generation Partnership Project;Technical Specification Group Radio Access Network;NR;Medium Access Control (MAC) protocol specification (Release 15), 67 pages.

3GPP TR 23.887 V12.0.0 (Dec. 2013), 3rd Generation Partnership Project;Technical Specification Group Services and System Aspects;Study on Machine-Type Communications (MTC) and other mobile data applications communications enhancements(Release 12), 151 pages.

3GPP TS 38.331 V15.1.0 (Mar. 2018), 3rd Generation Partnership Project;Technical Specification Group Radio Access Network;NR-;Radio Resource Control (RRC) protocol specification (Release 15), 268 pages.

3GPP TS 38.213 V15.0.0 (Dec. 2017), 3rd Generation Partnership Project;Technical Specification Group Radio Access Network;NR;Physical layer procedures for control(Release 15), 56 pages.

Samsung, "NR 2-step random access procedure", 3GPP TSG RAN WG1 NR Ad Hoc Spokane, Washington, USA, Jan. 16-20, 2017, R1-1700892, 5 pages.

Sony, "Discussions on 2 Steps RACH Procedure", 3GPP TSG RAN WG1 Meeting AH_NR Meeting Spokane, USA, Jan. 16-20, 2017, R1-1700668, 5 pages.

Motorola Mobility, "Physical channel design for 2-step RACH", 3GPP TSG RAN WG1 Meeting NR Spokane, USA, Jan. 16-20, 2017, R1-1700880, 5 pages.

3GPP TS 36.321 V15.1.0 (Mar. 2018), 3rd Generation Partnership Project; Technical Specification Group Radio Access Network; Evolved Universal Terrestrial Radio Access (E-UTRA); Medium Access Control (MAC) protocol specification (Release 15), 109 pages, Mar. 2018.

* cited by examiner

E: 0 indicates that a sub-PDU in a current subheader is the last MAC sub-PDU, and 1 indicates that there is another MAC sub-PDU after the current subheader T: 0 indicates that a BI field exists, and 1 indicates that an RAPI field exists in the subheader R: Reserved bit

RANDOM ACCESS PROCESSING METHOD AND RELATED DEVICE

CROSS-REFERENCE TO RELATED APPLICATIONS

This application is a continuation of International Application No. PCT/CN2019/081538, filed on Apr. 4, 2019, which claims priority to Chinese application No. 201810302231.6 filed on Apr. 4, 2018. The disclosures of the aforementioned applications are hereby incorporated by reference in their entireties.

TECHNICAL FIELD

Embodiments of this application relate to the field of wireless communications, and in particular, to a random access processing technology.

BACKGROUND

In a wireless communications system, transmission of various data is performed between a terminal side device and a network side device in uplink and downlink by using radio bearers (RB), through various protocol layers defined by the 3rd generation partnership project (3GPP) organization. For example, transmission of control signaling is performed on a signaling radio bearer or transmission of service data is performed on a data radio bearer. These protocol layers include a physical (PHY) layer, a media access control (MAC) layer, a radio link control (RLC) layer, a packet data convergence protocol (PDCP) layer, a radio resource control (RRC) layer, and the like.

Figure 1:
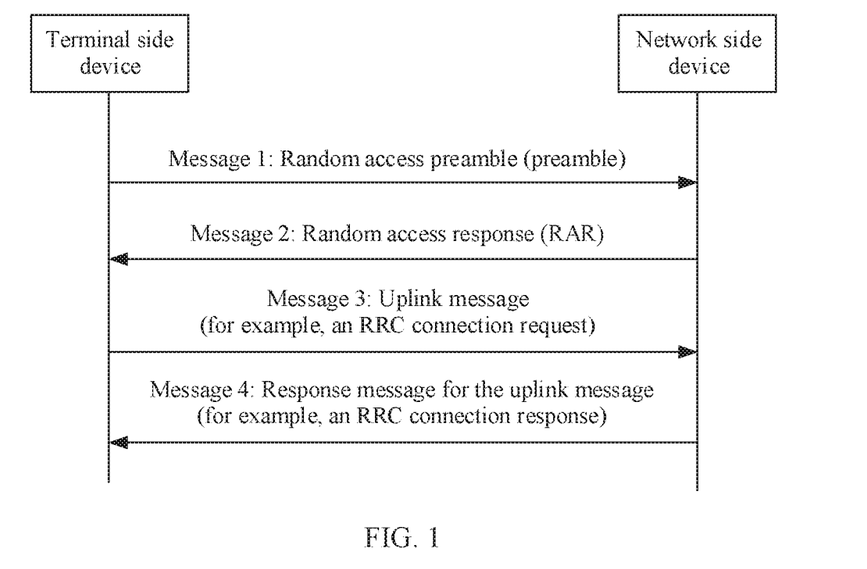
FIG. 1 is a schematic diagram of system interaction in a 4-step random access procedure according to an embodiment of this application.

Before the transmission of the various data is performed between the terminal side device and the network side device, the terminal side device establishes a connection with the network side device through a random access procedure. The random access procedure mainly includes a 4-step message flow. As shown in FIG. 1, in a message 1, the terminal side device sends a random access preamble to the network side device to initiate the random access procedure; in a message 2, the network side device sends a random access response (RAR) to the terminal side device, where the random access response indicates an uplink resource, a timing advance (TA), a temporary cell radio network temporary identifier (TC-RNTI) of the terminal side device, and the like; in a message 3, the terminal side device sends an uplink message to the network side device based on the random access response; and in a message 4, the network side device sends a response message for the uplink message to the terminal side device. The connection is established between the terminal side device and the network side device after the random access procedure is completed. The terminal side device can send uplink data to the network side device based on the connection.

As the wireless communications system develops, a requirement on a latency is increasingly high. In particular, in a 5th generation wireless communications system, a latency of the foregoing 4-step random access procedure is relatively large.

SUMMARY

Embodiments of this application provide a random access processing method and a related device, to reduce a latency in a random access procedure.

A first aspect of this application provides a random access processing method, including: determining, by a terminal side device, a random access resource and a resource of uplink data; and sending, by the terminal side device, a random access preamble by using the random access resource, and sending the uplink data by using the resource of the uplink data.

The terminal side device ends the random access procedure if the terminal side device has received feedback information for the uplink data in the random access procedure.

According to the technical solution provided in the first aspect, the uplink data is sent when the random access preamble is sent, and the random access procedure is ended in time after the feedback information for the uplink data is received. The uplink data can be sent before a random access response is received or the random access procedure is completed, so that a transmission latency of the uplink data can be reduced. In addition, the random access procedure can be ended as soon as possible, and therefore the transmission latency of the uplink data is further reduced.

In an optional implementation, that the terminal side device ends the random access procedure if the terminal side device has received feedback information for the uplink data specifically includes:

if the terminal side device has received the feedback information for the uplink data when the terminal side device has not received a random access response corresponding to the random access preamble, stopping, by the terminal side device, a timer for receiving the random access response;

if the terminal side device has received the feedback information for the uplink data when the terminal side device has received the random access response but has not sent an uplink message based on the random access response, skipping, by the terminal side device, sending the uplink message;

if the terminal side device has sent the uplink message based on the random access response and started a contention resolution timer, stopping, by the terminal side device, the contention resolution timer after receiving the feedback information for the uplink data; or if the terminal side device has received a response message corresponding to the uplink message, stopping, by the terminal side device, a timer for receiving the feedback information for the uplink data.

In this optional implementation, the terminal side device may determine, based on different time periods of receiving the feedback information, a specific manner for ending the random access procedure.

In an optional implementation, before the terminal side device sends the random access preamble and the uplink data, the method further includes: receiving, by the terminal side device, resource configuration information sent by a network side device, where the resource configuration information indicates the random access resource and the resource of the uplink data, and there is a correspondence between the random access resource and the resource of the uplink data.

In this optional implementation, it is specified that the resources used by the terminal side device to send the random access preamble and the uplink data are indicated by the network side device.

In an optional implementation, the method further includes: when the terminal side device has received the feedback information for the uplink data, stopping, by the terminal side device, the timer for receiving the feedback information.

In this optional implementation, after receiving the feedback information for the uplink data, the terminal side device stops the timer for receiving the feedback information, so that a resource waste can be reduced in time.

In an optional implementation, the feedback information is scrambled by using a radio network temporary identifier carried in the random access response or a random access radio network temporary identifier, and the method further includes: receiving, by the terminal side device, the feedback information based on the random access radio network temporary identifier associated with the random access resource or the radio network temporary identifier indicated in the random access response.

In this optional implementation, the identifier used for receiving the feedback information is specified. The random access radio network temporary identifier is determined by the terminal side device and the network side device, and the radio network temporary identifier is allocated by the network side device to the terminal side device and is carried in the random access response.

In an optional implementation, the method further includes: starting, by the terminal side device, the timer for receiving the random access response after sending the random access preamble or after sending the uplink data, and receiving, during running of the timer for receiving the random access response, the feedback information based on a random access radio network temporary identifier associated with the random access resource.

In this optional implementation, it is specified that the feedback information is received during running of the timer for receiving the random access response. To be specific, the timer for receiving the feedback information and the timer for receiving the random access response are the same timer, and the independent timer for receiving the feedback information may not be configured, so that a resource waste is reduced.

In an optional implementation, the method further includes: after sending the uplink data, starting, by the terminal side device, the timer for receiving the feedback information, and receiving the feedback information based on a random access radio network temporary identifier during running of the timer for receiving the feedback information.

In this optional implementation, it is specified that the feedback information is received during running of the timer for receiving the feedback information. In this implementation, the timer for receiving the feedback information and the timer for receiving the random access response may be different timers or may be the same timer. When the timers are different, receiving of the random access response and receiving of the feedback information may be independent of each other and do not affect each other.

In an optional implementation, the method further includes: after receiving the random access response, starting, by the terminal side device, the timer for receiving the random access response, and receiving the feedback information based on a temporary cell radio network temporary identifier or a random access radio network temporary identifier during running of the timer for receiving the random access response.

In this optional implementation, the identifier used for receiving the feedback information during running of the timer for the random access response is specified.

In an optional implementation, the method further includes: retransmitting the random access preamble and the uplink data when the feedback information received by the terminal side device indicates that the uplink data is not correctly received.

In this optional implementation, a retransmission operation performed by the terminal side device when the uplink data is not correctly received is specified. Resources used by the terminal side device to retransmit the random access preamble and the uplink data may be the same as or different from the resources used before the retransmission, and may be determined by the terminal side device or the network side device.

In an optional implementation, the method further includes: when the feedback information received by the terminal side device indicates that the uplink data is not correctly received, selecting a random access preamble, and sending the random access preamble and the uplink data.

In this optional implementation, a retransmission operation performed by the terminal side device when the uplink data is not correctly received is specified. Resources used by the terminal side device to send the random access preamble and retransmit the uplink data may be the same as or different from the resources used before the retransmission, and may be determined by the terminal side device, or may be determined by the network side device and then notified to the terminal side device.

A second aspect of the embodiments of this application provides a terminal side device. The terminal side device may be a terminal that is independently sold or a chip system applied to the terminal. The chip system includes a processor including at least one gate circuit and a memory including at least one gate circuit, each gate circuit includes at least one transistor (for example, a field effect transistor) connected by using a wire, and each transistor is made of a semiconductor material. The terminal side device includes a receiving unit, a sending unit, and a processing unit. The receiving unit is configured to perform a receiving action in the first aspect or the optional implementations, the sending unit is configured to perform a sending action in the first aspect or the optional implementations, and the processing unit is configured to perform a processing action such as determining, stopping, or starting in the first aspect or the optional implementations. Further, in specific implementation, the receiving unit and the sending unit are respectively a receiving circuit and a sending circuit, and the processor is a processing circuit. The terminal side device may further include: another electronic line such as a line used to connect the receiving circuit and the sending circuit, and a radio frequency antenna used to send a signal.

A third aspect of the embodiments of this application provides a computer storage medium. The computer storage medium includes program code, and the program code is used to implement the technical solutions provided in the first aspect or the optional implementations.

DETAILED DESCRIPTION OF ILLUSTRATIVE EMBODIMENTS

In a schematic diagram of system interaction shown in FIG. 1, a wireless communications system includes a terminal side device and a network side device.

The terminal side device may be a standalone terminal or a chip system in the terminal. The terminal, also referred to as user equipment (UE) or a mobile station (MS), includes a mobile phone, an internet of things device, a wearable device, or the like.

The network side device may be a standalone radio access device or a chip system in the radio access device. The radio access device may include protocol layers such as an RRC layer, a PDCP layer, an RLC layer, a MAC layer, a PHY layer, and the like. Optionally, the radio access device may include a base station and a wireless local area network access point. Base stations may be classified into two types: macro base stations and small base stations. The small base stations are further classified into micro base stations, pico base stations, and the like. The wireless local area network access point may be a router, a switch, or the like. The wireless local area network access point may provide wireless fidelity (Wi-Fi) signal coverage. Optionally, in a centralized unit-distributed unit (CU-DU) architecture, one radio access device is logically used as one system, and may include one CU and at least one DU. The CU is configured to implement functions of protocol layers such as the PDCP layer, the RRC layer, and the like of the radio access device, and the DU is configured to implement functions of the RLC layer, the MAC layer, and the PHY layer.

The terminal side device may access the network side device through a random access procedure, and then establish at least one RB with the network side device to transmit data. The data may include signaling data or service data. A radio bearer mainly used to transmit the signaling data is a signaling radio bearer (SRB), and a radio bearer mainly used to transmit the service data is a data radio bearer (DRB). The service data includes enhanced mobile broadband (eMBB) data, massive machine-type communication (mMTC) data, ultra-reliable low-latency communication (URLLC) data, and the like.

As the wireless communications system develops, a requirement on a latency of the 4-step random access procedure shown in FIG. 1 is relatively high, and the latency of the random access procedure significantly affects user experience of the terminal side device. In view of this problem, this application provides a random access processing method. The method is specifically described as follows.

A first embodiment of this application provides a random access processing method. A schematic flowchart shown in FIG. 2 includes the following steps.

Figure 2:
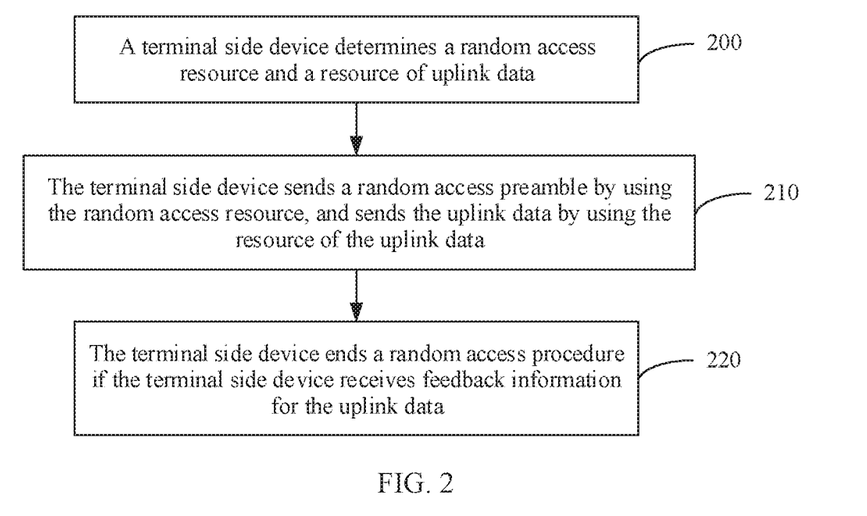
FIG. 2 is a schematic flowchart of a random access processing method according to an embodiment of this application.

200: A terminal side device determines a random access resource and a resource of uplink data.

The random access resource and the resource of the uplink data each include at least one of a time resource and a frequency resource.

Optionally, the resource of the uplink data may be a non-scheduling grant resource, for example, a semi-persistent scheduling resource or a configured grant resource defined in a 5th generation wireless communications system. The non-scheduling resource is periodic resources which are without scheduling and pre-configured by a network side device for the terminal side device. To be specific, the terminal side device can transmit data on these scheduling-free resources without sending a resource scheduling request to obtain a scheduling resource. The scheduling resource may be a resource indicated in a random access response corresponding to a random access preamble, or a resource requested from the network side device by using a buffer status report (BSR) or a scheduling request (SR) message.

Because data transmission is mainly based on a hybrid automatic repeat request mechanism, optionally, before a scheduling resource corresponding to a HARQ process is allocated to the terminal side device, the terminal side device sends the uplink data by using the non-scheduling grant resource in the HARQ process; and if the scheduling resource corresponding to the HARQ process is allocated to the terminal side device, the terminal side device sends the uplink data by using the scheduling resource in the HARQ process.

Optionally, there is a correspondence between the random access resource and the resource of the uplink data. The correspondence may be indicated by the network side device to the terminal side device, or may be determined by the terminal side device.

When the network side device indicates the correspondence, the network side device may explicitly indicate the correspondence, or the network side device may implicitly indicate the correspondence. For example, if both the random access resource and the resource of the uplink data are indicated in same configuration information, it implicitly indicates that the random access resource corresponds to the resource of the uplink data.

When the terminal side device determines the correspondence, the terminal side device may determine that an available resource located before or after a time domain position in which the random access resource is located is the corresponding resource of the uplink data. For example, when the terminal side device determines the correspondence, the terminal side device may determine that available resources located within predefined or configured X time offsets before or after the time domain position in which the random access resource is located is the corresponding resource of the uplink data. There may be two or more available resources corresponding to the resource of the uplink data. In this case, the terminal side device may select, from the available resources, a resource of a bandwidth part (BWP) allocated to the terminal side device, a resource with a highest frequency, or a resource with a lowest frequency, as a random access resource actually used for sending.

Optionally, the terminal side device may determine, based on radio signal quality, a frequency resource used to send the data. The frequency resource may be an uplink frequency resource or a supplementary uplink (SUL) frequency resource defined in an NR system. For example, if the radio signal quality is lower than a threshold, the SUL frequency resource is preferentially used. For example, if the radio signal quality is higher than the threshold, the UL frequency resource is preferentially selected. For example, a frequency resource with highest radio signal quality is selected from the UL frequency resource and SUL frequency resource.

For example, the network side device indicates, to the terminal side device, that a random access resource at a first frequency in a cell corresponds to a resource, of the uplink data, that is at a second frequency in the cell, where if the first frequency is an SUL frequency, the second frequency is a UL frequency; or if the first frequency is a UL frequency, the second frequency is an SUL frequency. For another example, the network side device indicates, to the terminal side device, that a random access resource on a BWP of a cell corresponds to a resource, of the uplink data, that is on another BWP of the cell.

The correspondence between the random access resource and the resource of the uplink data may be that one random access resource corresponds to a plurality of resources of the uplink data, a plurality of random access resources correspond to one resource of the uplink data, or a plurality of random access resources correspond to a plurality of resources of the uplink data. It should be noted that, because one random access preamble usually corresponds to one random access resource, the correspondence between the random access resource and the resource of the uplink data may be expressed as a correspondence between the random access preamble and the resource of the uplink data.

Optionally, there are a plurality of groups of resources of the uplink data, and each group of resources corresponds to one resource identifier. The network side device may indicate a group or several groups of resources of the uplink data corresponding to the random access resource.

Optionally, some random access resources correspond to the uplink data, and different random access resources correspond to different uplink data. For example, a random access resource 1 corresponds to uplink data 1, a random access resource 2 corresponds to uplink data 2, and a random access resource 3 does not correspond to any type of uplink data. When sending the random access preamble by using the random access resource 1, the terminal side device may send the corresponding uplink data 1. When sending the random access preamble by using the random access resource 2, the terminal side device may send the corresponding uplink data 2. Because the random access resource 3 does not correspond to any type of uplink data, the terminal side device may send the random access preamble by using the random access resource 3, but does not send the uplink data.

Optionally, a resource, of the uplink data, that is determined by the terminal side device and a resource, of the uplink data, that is indicated by the network side device do not overlap in time domain.

210: The terminal side device sends the random access preamble and the uplink data to the network side device.

The uplink data may include one or a combination of control signaling and service data. Optionally, the control signaling may be an RRC message, a MAC message, or the like. The service data may be a voice service, a multimedia service, or the like.

Optionally, before sending the random access preamble and the uplink data, the terminal side device may determine whether step 210 can be performed. Specifically, when the terminal side device determines that at least one or more of the following conditions are met, step 210 is performed; otherwise, step 210 may not be performed.

(1) The terminal side device supports sending the uplink data after sending the random access preamble and before receiving the random access response.

(2) An amount of data to be sent by the terminal side device is not greater than an amount of data that can be carried on the resource of the uplink data.

(3) The terminal side device is allowed by the network side device to perform step 210.

(4) An RRC layer or a MAC layer of the terminal side device receives an instruction for performing step 210.

(5) A quality of service level of the uplink data is a level that is preconfigured or that is specified by the network side device.

(6) A cause for the terminal side sending the uplink data is a cause that is preconfigured or that is specified by the network side device. For example, if the uplink data is emergency service data such as URLLC data, step 210 is performed.

It should be noted that the terminal side may determine, with reference to the foregoing conditions, whether to perform step 210, and the terminal side device may further determine, with reference to another condition, whether to actually perform step 210.

Optionally, after sending the random access preamble, the terminal side device starts a timer for the random access response corresponding to the random access preamble. The terminal side device receives, during running of the timer for receiving the random access response, feedback information for the uplink data based on a random access radio network temporary identifier associated with the random access resource. Optionally, after sending the random access preamble, the terminal side device starts a timer for the random access response corresponding to the random access preamble after a time offset (which is configured by the network side device or is predefined). Optionally, when the timer for receiving the random access response expires and the feedback information for the uplink data is still not received or is still not correctly received, the terminal side device determines that the uplink data fails to be sent.

Optionally, after sending the uplink data, the terminal side device starts (including initially starting or restarting) a timer for receiving the random access response, and the terminal side device receives, during running of the timer for receiving the random access response, the feedback information based on a random access radio network temporary identifier associated with the random access resource. Optionally, when the timer for receiving the random access response expires and the feedback information is still not correctly received, the terminal side device determines that the uplink data fails to be sent. Optionally, after sending the uplink data, the terminal side device starts a timer for receiving the random access response corresponding to the random access preamble, after a time offset (which is configured by the network side device or is predefined). If the network side device configures a maximum quantity of times that the terminal side device sends the uplink data, and a quantity of times of sending the uplink data has not reached the maximum quantity of times, the terminal side device starts the timer for receiving the random access response after initially transmitting or retransmitting the uplink data. In this case, the timer for receiving the random access response is reused when the terminal side device receives the feedback information.

Optionally, after receiving the random access response, the terminal side device receives the feedback information for the uplink data during the timer for receiving the random access response, and receives the feedback information based on a temporary cell radio network temporary identifier or a random access radio network temporary identifier associated with the random access resource. Optionally, after the terminal side device successfully receives the random access response, the terminal side device stops the timer for receiving the random access response. However, if the feedback information for the uplink data is still not received or is still not correctly received, and the timer for receiving the random access response is stopped, the terminal side device starts the timer for receiving the random access response, to continue to receive the feedback information during running of the timer for receiving the random access response. In this case, the same timer is reused for the random access response and the feedback information. Optionally, when the timer for receiving the random access response expires and the feedback information is not correctly received, the terminal side device determines that the uplink data fails to be sent.

Optionally, after sending the uplink data, the terminal side device starts a contention resolution timer to receive the feedback information for the uplink data, and the terminal side device receives, during running of the contention resolution timer, the feedback information based on a random access radio network temporary identifier associated with the random access resource. In this case, the contention resolution timer is reused to receive the feedback information.

Optionally, after receiving the random access response, the terminal side device starts a contention resolution timer to receive the feedback information for the uplink data, and receives the feedback information based on a temporary cell radio network temporary identifier or the random access radio network temporary identifier. Optionally, after receiving the random access response, the terminal side device starts the contention resolution timer after sending an uplink message (for example, a message 3) based on the random access response or after a time offset (which is configured by the network side device or is predefined). Optionally, when the contention resolution timer expires and the feedback information is still not correctly received, the terminal side device determines that the uplink data fails to be sent. In this case, the contention resolution timer is reused to receive the feedback information.

Optionally, after sending the uplink data, the terminal side device starts a first timer for receiving the feedback information, and the terminal side device receives the feedback information based on the random access radio network temporary identifier during running of the first timer.

Optionally, after receiving the random access response, the terminal side device starts a second timer for receiving the feedback information for the uplink data, and receives the feedback information based on a temporary cell radio network temporary identifier or the random access radio network temporary identifier. Optionally, after receiving the random access response, the terminal side device starts the second timer after a time offset (which is configured by the network side device or is predefined) or after sending an uplink message (for example, a message 3) based on the random access response.

It should be noted that the first timer and the second timer are each an independent timer for receiving the feedback information, and are not the same as the foregoing timer for receiving the random access response and the contention resolution timer.

220: The terminal side device ends the random access procedure if the terminal side device has received the feedback information for the uplink data in the random access procedure.

Optionally, before 210, the terminal side device receives configuration information sent by the network side device. The configuration information is sent in a broadcast, multicast, or unicast manner, and is carried in a system message. When the terminal side device is in an RRC idle mode, an inactive mode, or an RRC connected mode, the network side device notifies the terminal side device of the configuration information. The configuration information indicates one or any combination of the following:

the random access resource, a sequence used for the random access preamble, the resource of the uplink data, duration of the timer for receiving the random access response corresponding to the random access preamble, a start time of receiving the random access response, and the contention resolution timer of the terminal side device in the random access procedure, duration of the first timer and second timer for receiving the feedback for the uplink data, a time offset between the random access resource and the resource for sending the uplink data, a time offset between sending the random access preamble and starting the first timer, an offset between sending the uplink data and starting the first timer, and a time offset between a time at which the random access response has been received and a time of starting the second timer.

Figure 3:
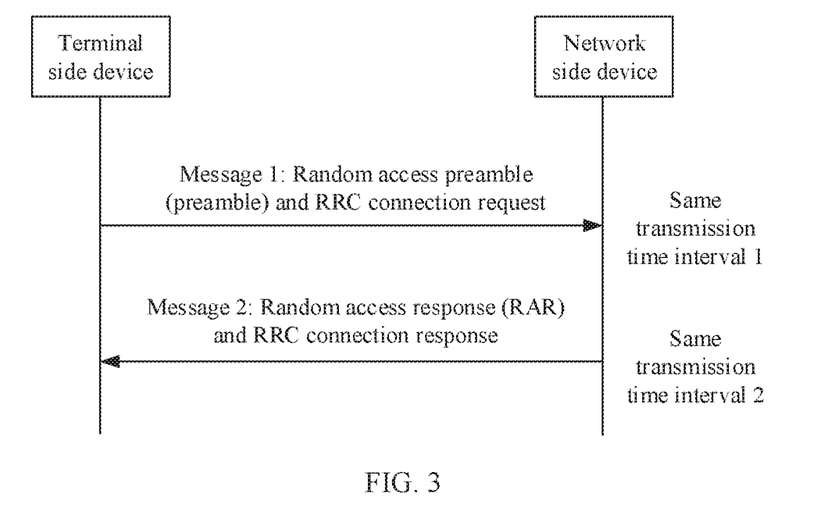
FIG. 3 is a schematic diagram of system interaction in a 2-step random access procedure according to an embodiment of this application.

This embodiment of this application is not only applicable to the foregoing 4-step random access procedure, but also applicable to a 2-step random access procedure. As shown in FIG. 3, a message 1 and a message 3 in the 4-step random access procedure are sent by the terminal side device to the network side device within a same time domain range, a message 2 and a message 4 are received by the terminal side device from the network side device within another same time domain range. The network side device may configure the terminal side device to use the 4-step random access procedure, the 2-step random access procedure, or both. It should be noted that the timers in the 4-step random access procedure or a random access resource, a random access preamble, or duration of timers in the 2-step random access procedure are configured by the network side device.

The feedback information for the uplink data includes one or a combination of the following: an identifier of the terminal side device, a MAC layer control element used to determine whether contention resolution succeeds, and information indicating whether the uplink data has been successfully received. If the feedback information received by the terminal side device includes the MAC layer control element, the MAC layer control element in the feedback information is compared with a MAC layer control element used when the uplink data is sent. If they are the same, it indicates that the contention resolution succeeds, and the terminal side device determines that the random access procedure succeeds. Generally, in the prior art, the random access procedure is ended. However, in this application, the terminal side device may continue to perform the random access procedure. If they are different, the contention resolution fails, resulting in a failure of the random access procedure.

Optionally, the feedback information for the uplink data further indicates whether the terminal side device is in the RRC connected mode or the inactive mode. The feedback information for the uplink data may be carried in a downlink MAC layer protocol data unit (PDU). Optionally, the MAC PDU may be the random access response. In this case, the feedback information for the uplink data is carried in the random access response.

Optionally, the uplink data includes information specific to the terminal side device, for example, the identifier of the terminal side device. Optionally, the identifier of the terminal side device may be a random access radio network temporary identifier (which is generated by the terminal side device in an agreed-on manner in a 3GPP protocol), or an identifier allocated by an access network or an identifier allocated by a core network in a wireless communications system that the terminal side device accessed before. The identifier allocated by the access network may be a cell radio network temporary identifier, a temporary cell radio network identifier, a demodulation reference signal specific to the terminal side device, an inactive radio network temporary identifier (I-RNTI) that is allocated by the access network and that is in an access stratum context of the terminal side device, a random number generated by the access network for the terminal side device, or a configured scheduling radio network temporary identifier (CS-RNTI). The access stratum context is configuration information of an RRC layer, a PDCP layer, an RLC layer, a MAC layer, and a PHY layer of the terminal side device in the RRC connected mode. Further, the identifier of the terminal side device may alternatively be represented by using high-order bits included in the I-RNTI, or may be represented by using low-order bits included in the I-RNTI. For example, the I-RNTI has 32 bits. 16 high-order bits may be used to represent the identifier of the terminal side device, or 16 low-order bits may be used to represent the identifier of the terminal side device, and the remaining bits may be used to identify the network side device that currently serves the terminal side device.

The terminal side device in the inactive mode may store the information about the access stratum context in the connected mode, where the information about the access stratum context includes the inactive radio network temporary identifier, and the identifier is unique in one public land mobile network (PLMN). The terminal side device in the inactive mode may receive, by using the I-RNTI, a paging message that is sent by the network side device using the I-RNTI.

As an implementation, in the implementations of the embodiments of this application, after the terminal side device sends the uplink data, the terminal side device blindly detects, by using the identifier of the terminal side device, downlink control information scrambled by using the identifier of the terminal side device, to attempt to receive the feedback information for the uplink data. In another implementation, after the terminal side device sends the random access preamble, the terminal side device blindly detects, based on the identifier of the terminal side device, downlink control information scrambled by using the identifier of the terminal side device, to attempt to receive the random access response corresponding to the random access preamble. The terminal side device further starts the timer for receiving the random access response.

Optionally, if the network side device successfully receives the random access preamble, but fails to identify the identifier (for example, the random access radio network temporary identifier) of the terminal side device, the network side device does not know the terminal side device that sends the random access preamble. In this case, the network side device may implicitly indicate the terminal side device to retransmit the random access preamble and the uplink data. For example, the network side device may not allocate the TC-RNTI or allocate an invalid TC-RNTI. Correspondingly, if the terminal receives the invalid TC-RNTI or does not receive the TC-RNTI, the terminal re-determines a random access resource, a random access preamble, and a resource of the uplink data, and re-sends the random access preamble and the uplink data. The re-determined random access resource, random access preamble, and resource of the uplink data may be different from those in previous transmission.

Optionally, if the network side device successfully receives the random access preamble and successfully identifies the terminal side device, but fails to decode the uplink data, the network side device may allocate an inappropriate uplink resource by using the random access response. For example, a size of the allocated uplink resource is o. For another example, a size of a transport block corresponding to the uplink resource is less than a threshold, and the threshold is a minimum quantity of bits that can be transmitted by using the uplink resource. Correspondingly, the terminal side device ignores the resource allocated by using the random access response. The network side device schedules, by using the cell radio network temporary identifier or the configured scheduling radio network temporary identifier that is specific to the terminal side device, the terminal side device to retransmit the uplink data, and the terminal side device retransmits the uplink data. In this case, the terminal side device may not send the random access preamble.

Optionally, after the terminal receives the retransmission indication, the terminal stops the contention resolution timer, stops the first timer for receiving the feedback information, or stops the second timer for receiving the feedback information for the uplink data, and the terminal side device retransmits the uplink data by using a retransmission resource scheduled by the network side device, and starts the contention resolution timer.

Optionally, after the terminal receives the retransmission indication, the terminal restarts the contention resolution timer, restarts the first timer for receiving the feedback information, or restarts the second timer for receiving the feedback information for the uplink data. When the terminal side device retransmits the uplink data by using the retransmission resource scheduled by the network side device, the terminal side device restarts the contention resolution timer, or restarts the first timer or second timer for receiving the feedback information.

In an implementation, the terminal side device receives the random access response, and blindly detects, based on the random access radio network temporary identifier corresponding to the random access resource, downlink control information scrambled by using the random access radio network temporary identifier, or blindly detects, based on the temporary cell radio network temporary identifier carried in the random access response, downlink control information scrambled by using the temporary cell radio network temporary identifier, to attempt to receive the feedback information for the uplink data. When the random access response received by the terminal includes an identifier, of the random access preamble, which is sent by the terminal side device, the terminal considers that the random access response is successful. In this implementation, the terminal side device first successfully receives the random access response, and then attempts to receive the feedback information for the uplink data. A legacy format of the random access response may not be changed, and the feedback information for the uplink data can also be received relatively quickly. The "legacy" herein refers to content defined in the 3GPP protocol before the application date of this application.

For example, the terminal side device sends a random access preamble 1 on a random access resource, and sends uplink data on a resource of the uplink data. The random access resource corresponds to a random access radio network temporary identifier 1. The terminal side device has received a random access response by using the random access radio network temporary identifier 1. A message subheader in the random access response includes a random access preamble identifier field (RAPID) of the corresponding random access preamble 1. Further, the terminal side device continues to blindly detect, by using the random access radio network temporary identifier 1, downlink control information scrambled by using the random access radio network temporary identifier 1, to receive feedback information for the uplink data.

Figure 4:
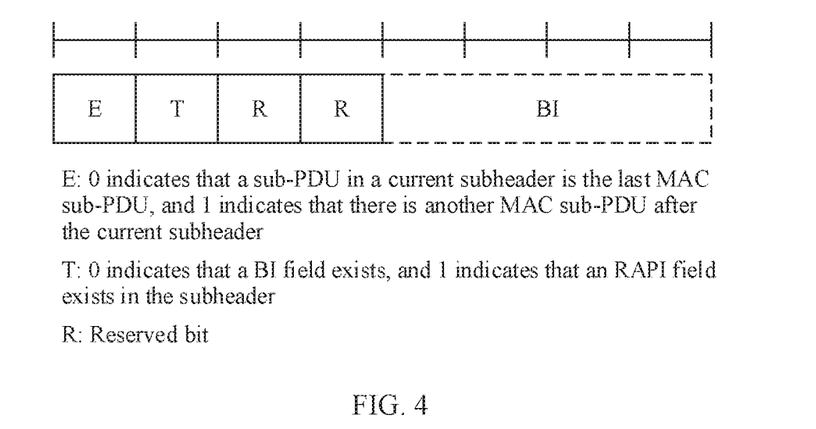
FIG. 4 is a schematic structural diagram of a subheader in a MAC protocol data unit according to an embodiment of this application.

Optionally, the network side device may indicate, in the downlink control information, a position of the feedback information for the uplink data. The feedback information for the uplink data may be carried in a downlink MAC PDU (for example, the random access response). One MAC PDU includes at least one MAC subheader, each MAC subheader includes a MAC sub-protocol data unit (PDU), and each sub-PDU includes a MAC service data unit (SDU). FIG. 4 is a schematic structural diagram of a subheader of the MAC PDU. The subheader includes an E field, a T field, an R field, and an optional backoff indicator (BI) field. The E field occupies 1 bit, a bit state o indicates that a sub-PDU in the current subheader is the last MAC sub-PDU, and a bit state 1 indicates that there is another MAC sub-PDU after the current subheader. The T field occupies 1 bit, a bit state o indicates that the current subheader includes the BI field, and a bit state 1 indicates that the current subheader includes the RAPID field. The two R fields are each a reserved bit of 1 bit. It should be noted that, when the BI field exists, the terminal side device considers that the current random access procedure fails, and initiates a next random access procedure after waiting for a period of time. The waiting time is randomly selected within a specific range, and a maximum value of the range may be indicated by the BI field or determined based on the BI field.

To carry the feedback information for the uplink data in the MAC PDU, in an optional manner, the E field and 1 bit of one of the two R fields (where the other R field is still reserved) are used to determine the feedback information for the uplink data. For example, if a bit state of the E field is 1, it indicates that there is a next MAC sub-PDU after the current subheader, and when a bit state of the R field is 1 (or o), it indicates that the feedback information for the uplink data is carried in the next MAC sub-PDU. In another optional implementation, one of the two R fields is used to determine the feedback information for the uplink data. For example, if a bit state of the R field is 1 (or o), it indicates that there is another extension field, and this extension field indicates a MAC sub-PDU in which the feedback information for the uplink data is located. The MAC sub-PDU is a MAC sub-PDU including a MAC SDU or a MAC sub-PDU including MAC control information.

In this case, the feedback information for the uplink data is transmitted by changing a legacy MAC message format. If the network side device successfully receives the uplink data before receiving the random access preamble, the network side device may send the feedback information for the uplink data by using the changed MAC message format, so that the terminal side device can receive the feedback information for the uplink data before receiving the random access response corresponding to the random access preamble.

In another implementation, the terminal side device has received the random access response, and blindly detects, based on the identifier (for example, the temporary cell radio network temporary identifier), of the terminal side device, that is carried in the random access response, downlink control information scrambled by using the identifier of the terminal side device, to attempt to receive the feedback information for the uplink data. The radio network temporary identifier is allocated by the network side device and is carried in the random access response. If 210 is performed when the terminal side device is in a non-connected mode with the network side device, the radio network temporary identifier is a temporary radio network temporary identifier. If 210 is performed when the terminal side device is in a connected mode with the network side device, and the network side device can identify the terminal side device, the radio network temporary identifier is a cell radio network temporary identifier or a CS-RNTI.

The network side device may configure a manner in which the terminal side device receives the feedback for the data. For example, the network side device configures the terminal side device to receive the downlink control information by using the random access radio network temporary identifier or a temporary terminal side identifier carried in the random access response, to attempt to receive the feedback information for the uplink data.

When the uplink data includes an RRC message, the feedback information for the uplink data may be a downlink RRC response message corresponding to the uplink RRC message. For example, the uplink RRC message may be an RRC connection setup request or an RRC connection resume request message, and the downlink response message may be an RRC connection release message, an RRC connection resume message, an RRC connection reject message, an RRC connection setup message, or the like. Optionally, if the downlink response message is an RRC message on which integrity protection is performed, the terminal side device determines, when integrity verification on the RRC message succeeds, that the uplink RRC message is correctly received. Optionally, the feedback information for the uplink data may be a partial bit stream of the uplink data. For example, at least first X bits or at least last X bits of the uplink data are used as the feedback information. The terminal side device may compare received X bits with X bits used for sending the uplink data. If they are the same, the terminal side device determines that the uplink data is correctly received; otherwise, the terminal side device determines that the uplink data is not correctly received. A specific value of X is stipulated in a 3GPP protocol or preconfigured by the network side.

Optionally, after sending the uplink data in a hybrid automatic repeat request (HARQ) process, the terminal side device starts the timer for the random access response of the HARQ process, starts the first timer for receiving the feedback information, or starts the second timer for receiving the feedback information for the uplink data. After receiving the random access response, the terminal side device sends the uplink message by using a HARQ process identifier o based on the random access response, or after receiving the feedback information, the terminal side device retransmits the uplink data by using a HARQ process identifier o. Optionally, the terminal may send the uplink data by using N HARQ processes, where N is greater than or equal to 1. In an implementation, the network side device may configure a quantity or identifiers of HARQ processes used by the terminal side device in the idle mode or the inactive mode. If the quantity or identifiers of HARQ processes are configured, the terminal side device and the network side device determine a correspondence between the resource of the uplink data and the HARQ process.

If a process identifier used for initial sending of the uplink data is not o, when receiving the random access response, the terminal side device initially transmits or retransmits the uplink data corresponding to the HARQ process identifier by using an uplink resource indicated in the random access response.

If a process identifier used for initial sending of the uplink data is not 0, when receiving the random access response, the terminal side device initially transmits or retransmits the uplink data corresponding to the HARQ process identifier by using a resource indicated in the random access response. If the HARQ process 0 is idle, the uplink data to be sent is obtained from a HARQ process corresponding to a message 3 buffer. The terminal side device may determine a HARQ ID based on time domain information of the resource and a quantity of available HARQ processes.

Optionally, if the random access resource is earlier than the resource of the uplink data in time domain, correspondingly, the network side device first receives the random access preamble in time domain, and then receives the uplink data. Specifically, the network side device may calculate a timing advance (TA) based on the received random access preamble, and then adjust, based on the TA, a time point at which the uplink data starts to be received, to receive the uplink data. In this manner, the following problem can be avoided: The uplink data cannot be correctly received because the terminal has not obtained the TA carried in the random access response and has not performed uplink synchronization with the network side device.

In 220, the terminal side device may end the random access procedure after the terminal side device has received the feedback information for the uplink data. Optionally, if the terminal side device does not receive the feedback information for the uplink data, the terminal side device keeps performing the random access procedure until the random access procedure is completed.

Optionally, if the terminal side device has received NACK feedback information for the uplink data, the terminal side device retransmits the random access preamble and the uplink data until the random access procedure is completed. In a retransmission process, the terminal side device may re-determine a random access resource, a random access preamble, and a resource of the uplink data.

Optionally, if the terminal side device still does not receive correct feedback information for the uplink data when a random access timer expires, the terminal side device continues to perform the random access procedure and send the uplink data until the random access procedure is completed.

In 220, that the terminal side device ends the random access procedure includes the following several cases.

(1) If the terminal side device has received the feedback information for the uplink data before receiving the random access response corresponding to the random access preamble, the terminal side device stops the timer for receiving the random access response.

In this case, after the terminal side device stops the timer for receiving the random access response, the terminal side device no longer continues to receive the random access response, and therefore does not continue to perform the method steps after the random access response, so that the random access procedure is ended in advance. Optionally, after obtaining the TA carried in the random access response, the terminal side device stops the timer for receiving the random access response.

(2) If the terminal side device has received the feedback information for the uplink data before receiving the random access response corresponding to the random access preamble, the terminal side device ends the random access procedure after the terminal side device has received the random access response.

In this case, the terminal side device may wait for the random access response, and obtain the TA carried in the random access response, to end the random access procedure after performing uplink synchronization with the network side device.

In this case, if the random access response is not received when the timer for receiving the random access response expires, the random access procedure is ended.

(3) If the terminal side device has received the feedback information for the uplink data after the terminal side device has received the random access response but before sending the uplink message based on the random access response, the terminal side device skips sending the uplink message.

In this case, the terminal side device skips sending the uplink message based on the random access response. The terminal side device skips sending the uplink message, and therefore does not continue to perform the method steps after sending the uplink message, so that the random access procedure is ended in advance.

(4) If the terminal side device has sent the uplink message based on the random access response and started the contention resolution timer, the terminal side device stops the contention resolution timer after receiving the feedback information for the uplink data.

In this case, because the terminal side device sends the uplink message based on the received random access response and starts the contention resolution timer, if the contention resolution timer still runs after the terminal side device receives the feedback information for the uplink data, the terminal side device stops the contention resolution timer, to end the random access procedure in advance.

Optionally, the uplink message may be a HARQ retransmission data packet of the uplink data, and a redundancy version for retransmission may be configured by the network side device or agreed on in a 3GPP protocol. For example, retransmission is performed by using a redundancy version (RV) of 0 or an RV of 2 specified in the 3GPP protocol.

Optionally, if the terminal side device has received the random access response, the terminal side device sends, by using the uplink resource indicated in the random access response, retransmitted data in the message 3 buffer, initially transmitted data in the message 3 buffer, buffered padding data, initially transmitted data in the HARQ process corresponding to the message 3 buffer, retransmitted data in the HARQ process corresponding to the message 3 buffer, or other uplink data in a HARQ process corresponding to a non-message 3 buffer.

(5) If the terminal side device receives the response message corresponding to the uplink message, the terminal side device stops the timer for receiving the feedback information for the uplink data.

In this case, because the terminal side device has received the response message, the random access procedure is to be completed. The terminal side device accesses the network side device after the random access procedure is completed. If the terminal side device still does not receive the feedback information for the uplink data, the terminal side device stops the timer for receiving the feedback information for the uplink data. In this way, the random access procedure can be completed as soon as possible, and the buffer of the HARQ process that is used for the uplink data is cleared.

Optionally, in any one of the foregoing four cases, when the feedback information is not received when the timer for receiving the feedback information for the uplink data expires, and when the random access response is not received when the timer for receiving the random access response expires, the terminal side device retransmits the random access preamble and the uplink data. In an optional implementation, the terminal side device re-determines a random access resource or preamble, and a resource of the data, initiates a random access procedure, and sends the uplink data.

Optionally, when a quantity of times that the terminal device retransmits the random access preamble or the uplink data reaches a preset maximum quantity of times or a maximum quantity of times that is configured by the network side device, the terminal device stops sending the uplink data, and notifies the RRC layer of the terminal side device of a random access procedure failure and a cause for the random access procedure failure. For example, the cause is that the quantity of times of sending the uplink data reaches the maximum quantity of sending times.

According to the technical solutions provided in the first embodiment of this application, the terminal side device may send the uplink data in the random access procedure. This can reduce a transmission latency of the uplink data. In addition, the terminal side device can end the random access procedure in advance after receiving the feedback information for the uplink data, so that the transmission latency of the uplink data is further reduced.

Figure 5:
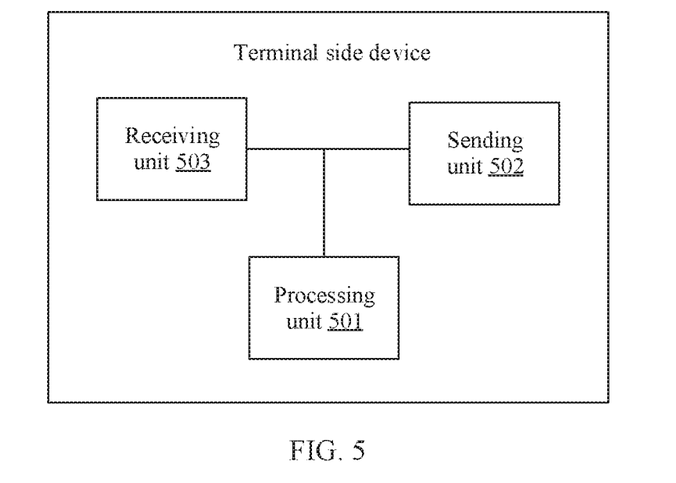
FIG. 5 is a schematic diagram of a unit structure of a terminal side device according to an embodiment of this application.

A second embodiment of this application provides a terminal side device. The terminal side device may be a terminal that is independently sold or a chip system applied to the terminal. The chip system includes a processor including at least one gate circuit and a memory including at least one gate circuit, each gate circuit includes at least one transistor (for example, a field effect transistor) connected by using a wire, and each transistor is made of a semiconductor material. As shown in FIG. 5, the terminal side device includes a receiving unit 503, a sending unit 502, and a processing unit 501.

The processing unit 501 is configured to determine a random access resource and a resource of uplink data. The sending unit 502 is configured to send a random access preamble by using the random access resource and send the uplink data by using the resource of the uplink data. The receiving unit 503 is configured to receive feedback information for the uplink data in the random access procedure. The processing unit 501 is further configured to end the random access procedure after the terminal side device has received the feedback information.

Optionally, that the processing unit 501 is configured to end the random access procedure specifically includes:

The processing unit is configured to: if the terminal side device has received the feedback information for the uplink data when the terminal side device has not received a random access response corresponding to the random access preamble, stop a timer for receiving the random access response; if the terminal side device has received the feedback information for the uplink data when the terminal side device has received the random access response but has not sent an uplink message based on the random access response, skip sending the uplink message; if the terminal side device has sent the uplink message based on the random access response and starts a contention resolution timer, stop the contention resolution timer after the terminal side device has received the feedback information for the uplink data; or if the terminal side device has received a response message corresponding to the uplink message, stop a timer for receiving the feedback information for the uplink data.

Optionally, the receiving unit 503 is further configured to: before the random access preamble and the uplink data are sent, receive resource configuration information sent by a network side device, where the resource configuration information indicates the random access resource and the resource of the uplink data, and there is a correspondence between the random access resource and the resource of the uplink data.

Optionally, the processing unit 501 is further configured to: when the terminal side device has received the feedback information for the uplink data, stop the timer for receiving the feedback information.

Optionally, the feedback information is scrambled by using a radio network temporary identifier carried in the random access response or a random access radio network temporary identifier. Correspondingly, the receiving unit 503 is further configured to receive the feedback information based on the random access radio network temporary identifier associated with the random access resource or the radio network temporary identifier indicated in the random access response.

Optionally, the processing unit 501 is further configured to start the timer for the random access response after the terminal side device sends the random access preamble or after the terminal side device sends the uplink data. Correspondingly, the receiving unit 503 is further configured to receive, during running of the timer for receiving the random access response, the feedback information based on a random access radio network temporary identifier associated with the random access resource.

Optionally, the processing unit 501 is further configured to: after the terminal side device sends the uplink data, start the timer for receiving the feedback information. Correspondingly, the receiving unit 503 is further configured to receive the feedback information based on a random access radio network temporary identifier during running of the timer for receiving the feedback information.

Optionally, the receiving unit 503 is further configured to: after receiving the random access response, receive the feedback information based on a temporary cell radio network temporary identifier or a random access radio network temporary identifier during running of the timer for receiving the random access response.

Optionally, the sending unit 502 is further configured to retransmit the random access preamble and the uplink data when the feedback information received by the terminal side device indicates that the uplink data is not correctly received.

It should be noted that the receiving unit is configured to perform a receiving action in the first embodiment or the implementations, the sending unit is configured to perform a sending action in the first embodiment or the implementations, and the processing unit is configured to perform a processing action such as determining, stopping, or starting in the first embodiment or the implementations. For details, refer to the foregoing first embodiment.

Figure 6:
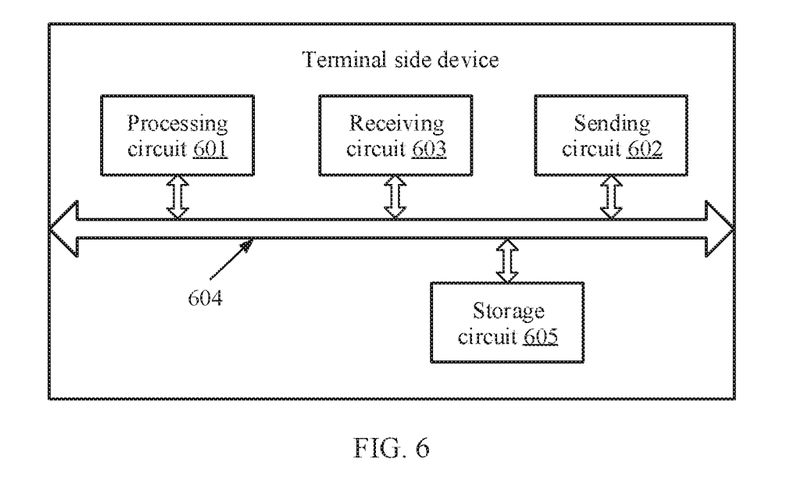
FIG. 6 is a schematic diagram of a hardware structure of a terminal side device according to an embodiment of this application.

Further, as shown in FIG. 6, in specific hardware implementation, the receiving unit 503 and the sending unit 502 are respectively a receiving circuit 603 and a sending circuit 602, and the processing unit 501 is a processing circuit 601. The terminal side device may further include: another electronic line such as a line 604 used to connect the receiving circuit and the sending circuit, a storage circuit 605, and a radio frequency antenna used to send a signal. The storage circuit 605 may include instruction code. When the instruction code is invoked, a function of the terminal side device in the first embodiment is implemented.

The line 604 may be a peripheral component interconnect (PCI) bus, an extended industry standard architecture (EISA) bus, or the like. The bus may be classified into an address bus, a data bus, a control bus, or the like.

The second embodiment of this application is an apparatus embodiment corresponding to the terminal side device in the first embodiment, and has beneficial effects similar to those of the first embodiment. For details, refer to the description in the first embodiment.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more chip systems or computer-usable storage media (including but not limited to a disk memory, a CD-ROM, an optical memory, and the like) that include computer-usable program code.

The present invention is described with reference to the flowcharts and/or block diagrams of the method, the apparatus (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

What is claimed is:

1. A random access processing method in a random access procedure, performed by a terminal side device, the method comprising:
   receiving from a network side device, configuration information indicating a random access resource and a time offset between the random access resource and a resource of uplink data;
   determining the resource of the uplink data based on the random access resource and the time offset;
   sending, to the network side device, a random access preamble on the random access resource, and the uplink data on the resource of the uplink data; and
   receiving, from the network side device, a random access response comprising feedback information for the uplink data;
   the random access response being a downlink medium access control (MAC) protocol data unit (PDU), the downlink MAC PDU comprising the feedback information and a MAC subheader, and the MAC subheader comprising an indication field; and
   in accordance with a bit state of the indication field indicating an extension field exists, the extension field indicates a MAC sub-PDU in which the feedback information is located.

2. The method according to claim 1, wherein the uplink data is an uplink radio resource control (RRC) message and the feedback information for the uplink data comprises a downlink RRC message corresponding to the uplink RRC message.

3. The method according to claim 1, wherein the feedback information for the uplink data comprises a MAC layer control element used to determine contention resolution success, and the method further comprises:
   stopping a timer for receiving the random access response and ending the random access procedure in response to the terminal side device having received the feedback information for the uplink data.

4. The method according to claim 3, wherein the configuration information further indicates a duration of the timer for receiving the random access response.

5. The method according to claim 1, wherein the method further comprises:
   determining a correspondence that a plurality of random access preambles correspond to one resource of the uplink data.

6. An apparatus, comprising: a non-transitory memory comprising instructions; and a processor coupled with the non-transitory memory, wherein the instructions are executed by the processor to cause the apparatus to: receive, from a network side device, configuration information for a random access procedure, wherein the configuration information indicates a random access resource and a time offset between the random access resource and a resource of uplink data; determine the resource of the uplink data based on the random access resource and the time offset; send, to the network side device, a random access preamble on the random access resource, and the uplink data on the resource of the uplink data; and receive, from the network side device, a random access response comprising feedback information for the uplink data; wherein the random access response is a downlink medium access control (MAC) protocol data unit (PDU), the downlink MAC PDU comprises the feedback information and a MAC subheader, and the MAC subheader comprise an indication field; and in accordance with a bit state of the indication field indicating an extension field exists, the extension field indicates a MAC sub-PDU in which the feedback information is located.

7. The apparatus according to claim 6, wherein the uplink data is an uplink radio resource control (RRC) message and the feedback information for the uplink data comprises a downlink RRC message corresponding to the uplink RRC message.

8. The apparatus according to claim 6, wherein the feedback information for the uplink data comprises a MAC layer control element used to determine contention resolution success, and the instructions are executed by the processor to further cause the apparatus to:

stop a timer for receiving the random access response and end the random access procedure in response to the apparatus having received the feedback information for the uplink data.

9. The apparatus according to claim 8, wherein the configuration information further indicates a duration of the timer for receiving the random access response.

10. The apparatus according to claim 6, wherein the instructions are executed by the processor to further cause the apparatus to:
determine a correspondence that a plurality of random access preambles corresponds to one resource of the uplink data.

11. An apparatus, comprising: a non-transitory memory comprising instructions; and a processor coupled with the non-transitory memory, wherein the instructions are executed by the processor to cause the apparatus to: send, to a terminal side device, configuration information for a random access procedure, wherein the configuration information indicates a random access resource and a time offset between the random access resource and a resource of uplink data; receive, from the terminal side device, a random access preamble on the random access resource and the uplink data on the resource of the uplink data; and send, to the terminal side device, a random access response comprising feedback information for the uplink data; wherein the random access response is a downlink medium access control (MAC) protocol data unit (PDU), the downlink MAC PDU comprises the feedback information and a MAC subheader, and the MAC subheader comprise an indication field; and in accordance with a bit state of the indication field indicating an extension field exists, the extension field indicates a MAC sub-PDU in which the feedback information is located.

12. The apparatus according to claim 11, wherein the uplink data is an uplink radio resource control (RRC) message and the feedback information for the uplink data comprises a downlink RRC message corresponding to the uplink RRC message.

13. The apparatus according to claim 11, wherein the configuration information further indicates a duration of a timer for the terminal side device receiving the random access response.

14. The apparatus according to claim 11, wherein the feedback information for the uplink data comprises a MAC layer control element used to determine contention resolution success.

15. A random access processing method in a random access procedure, performed by a network side device, the method comprising:
sending, to a terminal side device, configuration information for the random access procedure, wherein the configuration information indicates a random access resource and a time offset between the random access resource and a resource of uplink data;
receiving, from the terminal side device, a random access preamble on the random access resource and the uplink data on the resource of the uplink data; and
sending, to the terminal side device, a random access response comprising feedback information for the uplink data;
the random access response being a downlink medium access control (MAC) protocol data unit (PDU), the downlink MAC PDU comprising the feedback information and a MAC subheader, and the MAC subheader comprising an indication field; and
in accordance with a bit state of the indication field indicating an extension field exists, the extension field indicates a MAC sub-PDU in which the feedback information is located.

16. The method according to claim 15, wherein the uplink data is an uplink radio resource control (RRC) message and the feedback information for the uplink data comprises a downlink RRC message corresponding to the uplink RRC message.

17. The method according to claim 15, wherein the configuration information further indicates a duration of a timer for the terminal side device receiving the random access response.

18. The method according to claim 15, wherein the feedback information for the uplink data comprises a MAC layer control element used to determine contention resolution success.

* * * * *